UNITED STATES PATENT OFFICE.

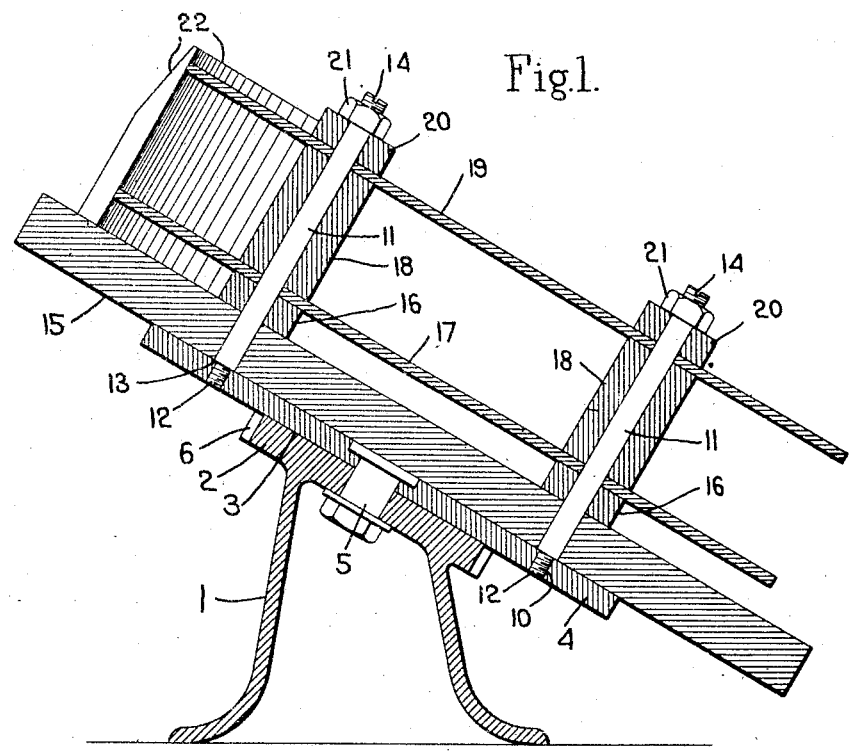
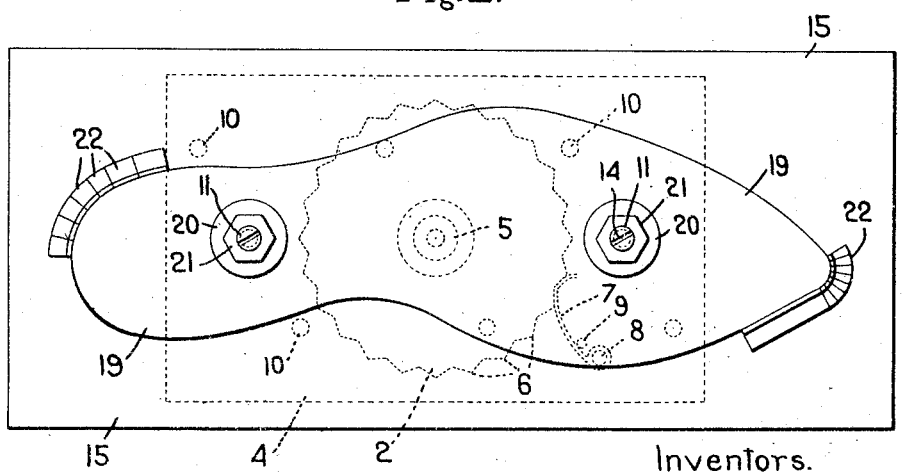
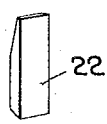

CARL G. ANDERSON, OF BOSTON, AND JOHN E. SWANSON, OF JAMAICA PLAIN, MASSACHUSETTS.

PROCESS AND APPARATUS FOR PRODUCING CUTTING-DIES.

1,365,075.   Specification of Letters Patent.   Patented Jan. 11, 1921.

Application filed August 28, 1920. Serial No. 406,648.

*To all whom it may concern:*

Be it known that we, CARL G. ANDERSON, a subject of the King of Sweden, and resident of Boston, county of Suffolk, State of Massachusetts, and JOHN E. SWANSON, a citizen of the United States, and resident of Jamaica Plain, county of Suffolk, State of Massachusetts, have invented an Improvement in Processes and Apparatus for Producing Cutting-Dies, of which the following description, in connection with the accompanying drawing, is a specification, like characters on the drawing representing like parts.

This invention relates to improvements in processes and apparatus for producing cutting dies such as are usually employed in cutting leather and other material into predetermined forms, such for example as the soles and uppers of shoes.

The method of making irregular cutting dies which has heretofore been practised is slow and expensive and requires unusual skill, and this is particularly true in respect to dies which are made for cutting parts of shoes, since a different die is required to be prepared for every size of every part of the shoe in order that the shoe may be made rapidly and economically. Furthermore, the various types of shoes require different dies and as the styles change from year to year numerous new dies are constantly required. The expense involved in producing such dies by skilled labor is enormous and greatly increases the overhead of shoe factories.

The object of the present invention is to provide a method for producing cutting dies of cast metal, by which the dies may be rapidly and economically made irrespective of form, size or depth.

More specifically the present invention constitutes certain improvements upon the invention disclosed in the application of Carl G. Anderson No. 347506, filed December 26, 1919, for processes in making dies.

The present invention also includes the production of a machine for assisting in the performance of the process herein described, the object of the machine being to provide a device upon which a pattern for a die of any predetermined size or shape may be constructed with a minimum amount of labor and which will be of such character that the pattern may be formed by an unskilled laborer.

A further object of the invention is to provide a machine having means for supporting one or more templets conforming to the contour of the die to be produced, so arranged that a series of units corresponding in cross section to that of the die, may be assembled around the periphery of the templet in a convenient manner.

A further object of the invention is to provide a machine of the character described with means for so supporting the templet or a plurality of superposed templets that said templets may be rotated about an axis to permit the units to be associated thereupon in a position in which they will be supported while being assembled.

Other objects and features of the invention will more fully appear in the following description and be pointed out in the annexed claims.

A convenient form of mechanism for assisting in the performance of the process, which forms the present invention, is illustrated in the accompanying drawings, in which, Figure 1 is a vertical, longitudinal, sectional view of the apparatus, Fig. 2 is a plan view of the same, and, Fig. 3 is a perspective view of one of the preferred forms of units.

The improved method of forming patterns for cutting dies consists broadly in associating together, along a line substantially conforming to the cutting contour of the die, a plurality of juxtaposed units having a cross section corresponding to that of the die, the adjacent edges of said units being secured together, so that the pattern when completed will be substantially identical in form with that of the die to be produced. It is usually desirable that the die pattern shall be secured to a suitable base in order to give rigidity to the pattern and also to produce a convenient means for handling the die during the molding operation. In such case the bases of the units are rigidly secured to a base by a suitable adhesive and preferably the contacting edges of the units are also secured together by an adhesive material.

In forming a die pattern in accordance with this method the units desirably are formed of relatively inexpensive material such as wood, the wood being so cut that its grain extends longitudinally of the pattern which corresponds to the blade of the die.

In order that the units may be arranged accurately along curves and around sharp angles, the units desirably are made of different widths and the narrower units provided with beveled or mitered edges so that when assembled both the inner and outer wall will present a substantially continuous line or surface corresponding to the desired contour. In any event, the units are so designed and associated that their inner edges will form a contact which will present a smooth inner surface and any separation which may occur between the outer edges of the units will be filled with a suitable plastic material, so that both inner and outer surfaces of the pattern will be smooth.

The preferred method of producing a die pattern in accordance with the present invention consists in assembling selected units, of the character described, along the margin of one, or preferably a plurality of superposed templets which correspond accurately to the contour of the die to be produced, the templets being of such a size as to produce a pattern which will allow for the shrinkage of the metal in casting from a mold produced by such a die. Any suitable means may be employed for supporting the templet or templets while the units are being associated around the periphery of the same. Desirably, the templets are supported in parallelism at a convenient distance apart, and preferably at a distance from a suitable base. A suitable adhesive, such as glue, is applied to the edges, and preferably, also, to the base of the units as they are about to be assembled around the templets.

In thus producing the die pattern wide units may be employed for the straight sides of the pattern, while narrower units, having suitably beveled edges, may be employed to conform to the curved portions of the templet.

When the units have been thus assembled and the adhesive uniting them together, or to the base, or both, has set, the templets may be removed and the die finished by filling the interstices between any separated edges of the units with a suitable filler. The pattern thus formed may also be shellacked, if so desired, to produce a smooth molding surface.

The cutting die which is made from the pattern desirably is formed of cast steel and is afterward tempered and sharpened in the usual manner.

A convenient machine for use in performing the process as illustrated in the accompanying drawing as mounted upon a stand 1 having a top 2, which preferably presents an inclined face 3. A table 4 of any suitable dimension is pivotally mounted upon a stud 5 which is journaled in a suitable bearing in the top 2 of the table. The periphery of the top 2 of the stand desirably is provided with a series of teeth 6, which are engaged by a spring 7, secured by a stud 8 to the bottom of the table 4. A pin 9 also secured to the bottom of the table serves normally to force the spring 7 into engagement with the teeth 6 of the stand. By reason of this mechanism the table may be locked in any rotative position, but such holding means is adapted to enable the table to be readily rotated, by the operator, in either direction to a new position.

The table 4 is provided with a series of sockets 10 which desirably are disposed in rows extending longitudinally of the table, the sockets in adjacent rows being located in staggered relation to each other.

Posts 11, for supporting suitable templets or patterns corresponding to the contour of the die to be produced, are adapted to be removably secured in the sockets 10.

As illustrated herein, the lower ends of the posts 11 are provided with reduced, screw threaded sections 12 which engage the complementary screw threads in the walls of the sockets 10. The shoulder 13 formed by the reduced portion 12 rests upon the surface of the table 4 and holds the post in perpendicular relation to the table. The upper end of the post 11 desirably is provided with a slot 14 to receive a screw driver and thereby to enable the post to be secured to the table or to be removed therefrom.

Each post is provided with means for supporting a templet or plurality of templets in parallelism with the table. As illustrated herein, two posts are provided for supporting templets corresponding to the form of a sole die and each post is provided with three sleeves for spacing the templets in proper relation to the table or base of the pattern and in proper relation to each other.

A base 15 for the pattern of wood or any other suitable material, provided with suitable holes to receive the posts 11 is placed upon the table 4; sleeves 16 slidably fitting upon the posts serve to support a templet 17 in parallelism with the base and at a suitable distance therefrom. Other sleeves 18 likewise slidably fitting upon the posts, provide means for supporting a second templet 19 in parallelism with the templet 17 and at a suitable distance therefrom. Other sleeves 20 fitting upon the post, rest upon the upper surface of the templet 19 and act as washers for nuts 21 upon the screw threaded upper ends of the posts 11.

Obviously, the length of the posts 11 and the lengths of the sleeves 16, 18 and 20 may be varied according to the height of the die pattern to be produced to enable the templets to support properly the units which form the pattern.

In place of two templets, a single thick templet may be employed, or a greater number of templets, as may be desirable.

In the operation of the machine the base for the die pattern is bored with suitable holes, which preferably are located in the longitudinal axis of the pattern to be produced and at any suitable distance apart corresponding to the distance between the sockets in the table.

The posts 11 are then placed in the selected sockets and the base 15 slipped over the posts until it rests upon the surface of the table. The sleeves 16 are then placed upon the posts and the lowermost templet, in which holes corresponding in position to those in the base have been bored, is placed upon the sleeves 16 thereby being supported in parallelism with the base 15, but spaced apart therefrom a distance corresponding to the height of the sleeves 16. The sleeves 18 are then slipped upon the post and the upper templet 19, which corresponds exactly to the templet 17, is placed upon the top of the sleeves 18. The sleeves 20 are then slipped on the posts and the nuts 21 applied and screwed down thereby clamping the base, the templets and the sleeves which support and separate them together and to the table 4. The operator then applies to the periphery of the templets a series of units 22, said units having a cross section corresponding to the cross section of the die which is to be formed. These units preferably are secured to the base 15 and to each other by glue or any other suitable adhesive, but may, of course be provided with other means for affixing them to the base or to each other.

The units thus associated together may be caused to extend continuously around the templets, thus providing a pattern which corresponds to the die which is to be produced. By forming these units in different widths a pattern may be rapidly produced as the wide units may be utilized along the straight or nearly straight portions of the pattern, while the narrow units may be used upon curved or irregular angular portions of the pattern. Special units may be provided for sharp angles or curves, or for producing irregular designs.

Preferably the units are so formed that when assembled the contacting edges will produce a smooth inner pattern surface irrespective of the angular relation each unit bears to its neighbor. A convenient means for effecting this purpose consists in providing units of different widths having differently beveled or mitered edges so that when the units are assembled around the templet the complementary edges of adjacent units will lie closely together, so that the die will be provided with a smooth inner face and a substantially smooth outer face. Any interstices between the outer edges of the units may be filled with a suitable filler.

By supporting the table 4 in an angular position, the uppermost portion of the base and the superimposed templets will be so situated that as the units 22 are successively applied they will be held by gravity in the proper position, thereby relieving the operator of the necessity of holding them in such a position while the glue or other adhesive sets sufficiently to prevent them from falling out of place. Thus the operator is enabled to easily assemble the units around the entire templet without moving from an advantageous position.

The spring 7 carried by the table, which engages the tooth 6 of the stand, holds the table temporarily in any position to which it is moved by the operator, but permits the operator to move the table in either direction as he may desire.

It will thus be seen that a convenient mechanism is herein disclosed for forming the process above described. It will, however, be understood that the mechanism disclosed herein is merely illustrative and not restrictive and that various changes in form of construction and arrangement of parts may be made within the spirit and scope of the following claims.

Having thus described our invention, what we claim as new and desire to obtain by Letters Patent, is:

1. The method of forming molding patterns for dies which consists in arranging together a series of juxtaposed units, having a cross section corresponding substantially to that of the die, along the margin of a plurality of superposed templets, affixing said units to each other and removing the templets.

2. The method of forming molding patterns for dies which consists in arranging upon a base a series of juxtaposed units, having a cross section corresponding substantially to that of the die, along the margin of a templet spaced apart from said base, affixing said units to said base and to each other and removing said templet.

3. The method of forming molding patterns for dies which consists in arranging upon a base along the margin of a templet parallel to and spaced apart from said base, a series of juxtaposed units having a cross section corresponding substantially to that of the die, and provided with contacting edges so formed as to produce a pattern which, when assembled, will have a smooth continuous inner face, and securing said units to said base and to each other.

4. The method of forming molding patterns for dies which consists in arranging upon a base along the margin of a templet parallel to and spaced apart from said base, a series of juxtaposed units having a cross section corresponding substantially to that of the die and provided with complementary suitably beveled contacting edges adapted to permit said units to be arranged in angular relation to each other while maintaining a continuous wall for the inner face of the pattern, and a substantially continuous wall for the outer face.

5. A machine for forming molding patterns for dies comprising a table having means for removably supporting in parallelism therewith and spaced apart therefrom, a templet conforming to the contour of the die to be formed, whereby a plurality of units having a cross section corresponding to that of the die may be associated, along said templet, and secured to said base to produce a die pattern.

6. A machine for molding patterns for dies comprising a table having means for detachably supporting a base for the pattern and means for removably supporting in parallelism therewith and spaced apart therefrom and from each other, a plurality of templets conforming to the contour of the die to be formed.

7. A machine for forming molding patterns for dies comprising a stand having rotatably secured thereto a table provided with means for detachably supporting a base for the pattern and means for removably supporting in parallelism with said base and spaced apart therefrom, a templet conforming to the contour of the die to be formed.

8. A machine for forming molding patterns for dies comprising a stand having rotatably secured thereto a table provided with means for detachably supporting a base for the pattern and means for removably supporting in parallelism with said base and spaced apart therefrom, a templet conforming to the contour of the die to be formed, and means operable to hold the table in any desired position of rotation.

9. A machine for forming molding patterns for dies comprising a stand, a table pivotally mounted upon said stand in angular relation to the axis of said stand, means for detachably securing a base for the pattern to said table and means for detachably securing a templet in parallelism with said table and at a distance therefrom.

10. A machine for forming molding patterns for dies comprising a table having a series of rows of post receiving sockets, the sockets in the different rows being staggered in respect to those of the adjacent row, a plurality of posts adapted to be removably secured in said sockets, sleeves removably fitting said posts and nuts for the free ends of said posts.

In testimony whereof, we have signed our names to this specification.

CARL G. ANDERSON.
JOHN E. SWANSON.